United States Patent
Knickerbocker et al.

(10) Patent No.: US 7,836,353 B2
(45) Date of Patent: Nov. 16, 2010

(54) METHOD TO ENHANCE MICRO-C4 RELIABILITY BY REDUCING THE IMPACT OF HOT SPOT PULSING

(75) Inventors: John U. Knickerbocker, Monroe, NY (US); Gerard McVicker, Stormville, NY (US); Sri M. Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 11/745,172

(22) Filed: May 7, 2007

(65) Prior Publication Data

US 2008/0282114 A1 Nov. 13, 2008

(51) Int. Cl.
G06F 11/00 (2006.01)
(52) U.S. Cl. ...................................... 714/47
(58) Field of Classification Search .................. 714/47, 714/182
See application file for complete search history.

(56) References Cited

U.S. PATENT DOCUMENTS

| 7,711,395 B2* | 5/2010 | Oba ........................... 455/574 |
| 2009/0015278 A1* | 1/2009 | Dang et al. .................. 324/755 |
| 2009/0039911 A1* | 2/2009 | Dang et al. .................. 324/765 |

OTHER PUBLICATIONS

Hongfang Wang, Vibration Fatigue Experiments of SMT Solder Joint, Mar. 6, 2003, pp. 1143-1156, Shanghai, China, Elsevier Ltd.
Robert Darveaux, Reliability of Area Array Solder Joints In Bending, Amkor Technology, Inc.
Karl Puttlitz, Area Array Interconnection Handbook, pp. 506-520, Kluwer Academic Publishers.
Katsuaki Suganuma, Lead-Free Soldering In Electronics, pp. 188-192, Marcel Dekker, Inc., 2004, New York.

* cited by examiner

*Primary Examiner*—Robert Beausoliel
*Assistant Examiner*—Amine Riad
(74) *Attorney, Agent, or Firm*—Cantor Colburn LLP; Daniel Morris

(57) ABSTRACT

A system for reducing an impact of hot spot pulsing of a semiconductor device including: first generating means for generating a plurality of local op-codes; a sequencer for augmenting customer op-codes with the plurality of local op-codes; selecting means for selecting one or more of the randomly arriving customer op-codes awaiting execution; monitoring means for tracking which of the one or more randomly arriving customer op-codes have been selected; separating means for separating the plurality of local op-codes from the one or more customer op-codes; storing means for storing one or more data related to the processing of the plurality of local op-codes and the customer op-codes; and second generating means for generating an output for a customer corresponding to that customer op-code while gainfully employing an output generated by local op-codes for system health monitoring purpose.

12 Claims, 5 Drawing Sheets

METHOD TO ENHANCE MICRO-C4 RELIABILITY BY REDUCING THE IMPACT OF HOT SPOT PULSING

STATEMENT OF GOVERNMENT INTEREST

This invention, was made with Government support under contract No.: H98230-04-C-920 awarded by The National Security Agency. The government has certain rights in this invention.

TRADEMARKS

IBM® is a registered trademark of International Business Machines Corporation, Armonk, N.Y. U.S.A. Other names used herein may be registered trademarks, trademarks or product names of International Business Machines Corporation or other companies.

BACKGROUND OF THE INVENTION

1. Field of the Invention

This invention relates to electronic packaging, and particularly to a method for providing micro-C4 reliability by reducing the impact of hot spot pulsing.

2. Description of Background

An electronic package typically consists of a silicon chip (e.g., 15×15 mm) and a substrate (e.g., 40×40 mm) joined by an array of solder bumps called C4, or "controlled collapsed chip connection" (e.g., 100 μm diameter×100 μm height×200 μm pitch). An advanced electronic package may consist of multiple silicon chips assembled over a single planar silicon substrate (e.g., 40×40 mm), called a silicon carrier, which is attached to a substrate using C4s. In an advanced package, the silicon chips are attached to the silicon carrier using μ-C4s (e.g., 25 μm diameter×10 μm height×50 μm pitch).

The reliability of an electronic package is affected by the fatigue life of its solder joints. Industry testing on conventional wear-out mechanisms in an electronic packaging generally focuses on low-cycle fatigue in which an assembly is subjected to deep thermal cycles (DTC) (e.g., −55° C. to 125° C.). Solder joints are subjected to significant plastic strain under DTC. A certain amount of vibration testing is also performed in which high-cycle fatigue life is evaluated. Under high-cycle fatigue the strain levels are weak and the solder can be considered more elastic than, plastic.

Power dissipated in a microprocessor is non-uniformity distributed among its logical units, it is expected, for example, that a floating-point unit may dissipate power at a much higher density (e.g., 5× to 7×) than the rest of a microprocessor in a numerically intensive computing environment. The localized dissipation of heat at higher power densities can result in zones with substantially higher temperatures. These zones are referred to as "hot spots." On a high performance processor (e.g., 8×12 mm) several hot spots may exist, in this description two hot spots, each (e.g., 2×2 mm) in size, is considered. These hot spots may release 20 W of thermal power each while the remaining chip is dissipating 60 W. Cooling solutions can contain, peak temperatures below a pre-selected level. Since the hot spots are utilized according to customer workload, the power dissipated in a chip is not only non-uniformity, but also varies by time. The customer workload therefore arrives for processing at random time intervals. Thus, the temperature near a hot spot is likely to fluctuate accordingly.

Steady power dissipation often results in steady temperature gradients within an electronic package. Therefore, the strain level due to coefficient of thermal expansion (CTE) mismatch and temperature gradient is also steady. Since the solder has creep properties, initial strain following a power-ON event is known to relax to a steady value after a delay in time, typically in minutes or some fraction of an hour, depending on the temperature and composition of the solder. New generation of lead-free solder tends to have low creep rate. The repetition rate of this strain cycle, which would amount to a few power-On/Off cycles per day, contributes to relatively lower strains and thus takes many cycles to induce fatigue failure. DTC testing essentially evaluates the power-On/Off life under accelerated conditions. However, when hot spots are randomly activated due to customer workload, power dissipation fluctuates.

This fluctuation, referred to as hot spot pulsing, in turn results in transient strain cycles. Hot spot pulsing conditions have likely always been in existence in electronic systems, but they have not been significant enough to trigger a new failure mode. Detailed analysis of an advanced package system reveals that, when hot spot power density is pushed more than 5× that of the average power density of a chip, substantial strain levels can occur due to temperature gradient. Furthermore, if the effect of the CTE differential, for example of an organic substrate, is included in the strain analysis, the solder strain levels caused by hot spot pulsing are likely to increase further. Since the time scale of hot spot pulsing is of the order of milliseconds, time interval needed for solder relaxation is insufficient and solder creep may not play a significant role in determining the solder fatigue failure.

Considering the above limitations, it is desired to improve the reliability of μ-C4s and C4s against hot spot driven, high cycle fatigue failure.

SUMMARY OF THE INVENTION

The shortcomings of the prior art are overcome and additional advantages are provided through the provision of a system comprising: first generating, means for generating a plurality of local op-codes; a sequencer for augmenting customer op-codes with the plurality of local op-codes; selecting means for selecting one or snore of the randomly arriving customer op-codes awaiting execution; monitoring means for tracking which of the one or more randomly arriving customer op-codes have been selected; separating means for separating the plurality of local op-codes horn the one or more customer op-codes; storing means for storing one or more data related to the processing of the plurality of local op-codes and the customer op-codes; and second generating means for generating an output for a customer corresponding to that customer op-code while gainfully employing an output generated by local op-codes her system health monitoring purposes.

The shortcomings of the prior art are overcome and additional advantages are provided through the provision of a method comprising: generating a plurality of local op-codes; augmenting customer op-codes with the plurality of local op-codes via a sequencer; selecting one or more of the customer op-codes awaiting execution; tracking which of the one or more customer op-codes have been selected for execution; separating the plurality of local op-codes horn the one or more customer op-codes; storing one or more data resulting from the processing of the plurality of local op-codes; and generating an output for a customer corresponding to that customer op-code while gainfully employing an output generated by local op-codes for system health monitoring purposes.

Additional features and advantages are realized, through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution for an improved method, concerning the reliability of μ-C4s and C4s against hot spot driven high-cycle fatigue failure.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the folio wing detailed description taken in conjunction with the accompanying drawings in which;

DETAILED DESCRIPTION OF THE INVENTION

One aspect of the exemplary embodiments is a method concerning the reliability of μ-C4s and C4s against hot spot driven high-cycle fatigue failure. Another aspect of the exemplary embodiments is a method for minimizing temperature fluctuation either as an open loop system or as a feedback system by leveraging the onboard temperature sensors of a chip. The ultimate goal of minimizing the strain fluctuation can be enhanced by means of measuring strain itself using embedded strain sensors augmented by temperature sensors.

In electronic packages, hot spot pulsing could cause substantial cyclic strain in μ-C4, thus contributing to high-cycle fatigue. The random arrival pattern of customer workload is therefore augmented by internally generated work (useful or artificial) so that hot spot temperature fluctuation is minimized according to cost/benefit criteria. Tire internal workload is generated by streaming a power generating operating code (referred to as op-code) sequence so that the power pulse amplitude and pulse widths are chosen to minimise the strain in μ-C4. This may be achieved via the exemplary embodiments described below in accordance with FIGS. 1-5.

Figure 1:
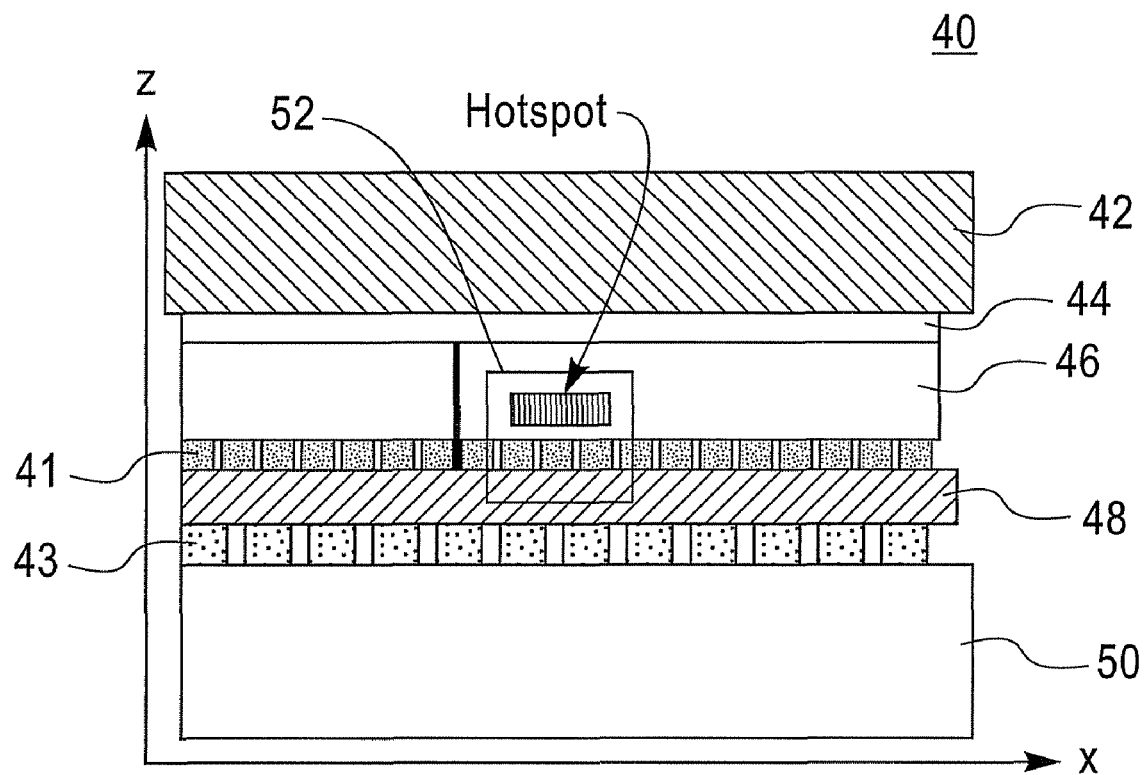
FIG. 1 is a schematic diagram of an advanced electronic package with a processor hot spot, in accordance with an embodiment of the invention.

FIG. 1 is a schematic (side view) diagram of an advanced electronic package with a processor hot spot, in accordance with an embodiment of the invention. The electronic package 40 of FIG. 1 includes a cooling solution 42, a thermal interface material 44, a microprocessor 46, a chip carrier 48, and a substrate 50. The hot spot 52 is located in the microprocessor 46. There are also two layers, C4 and μ-C4. C4 is designated as 41 and μ-C4 is designated as 43.

Figure 2:
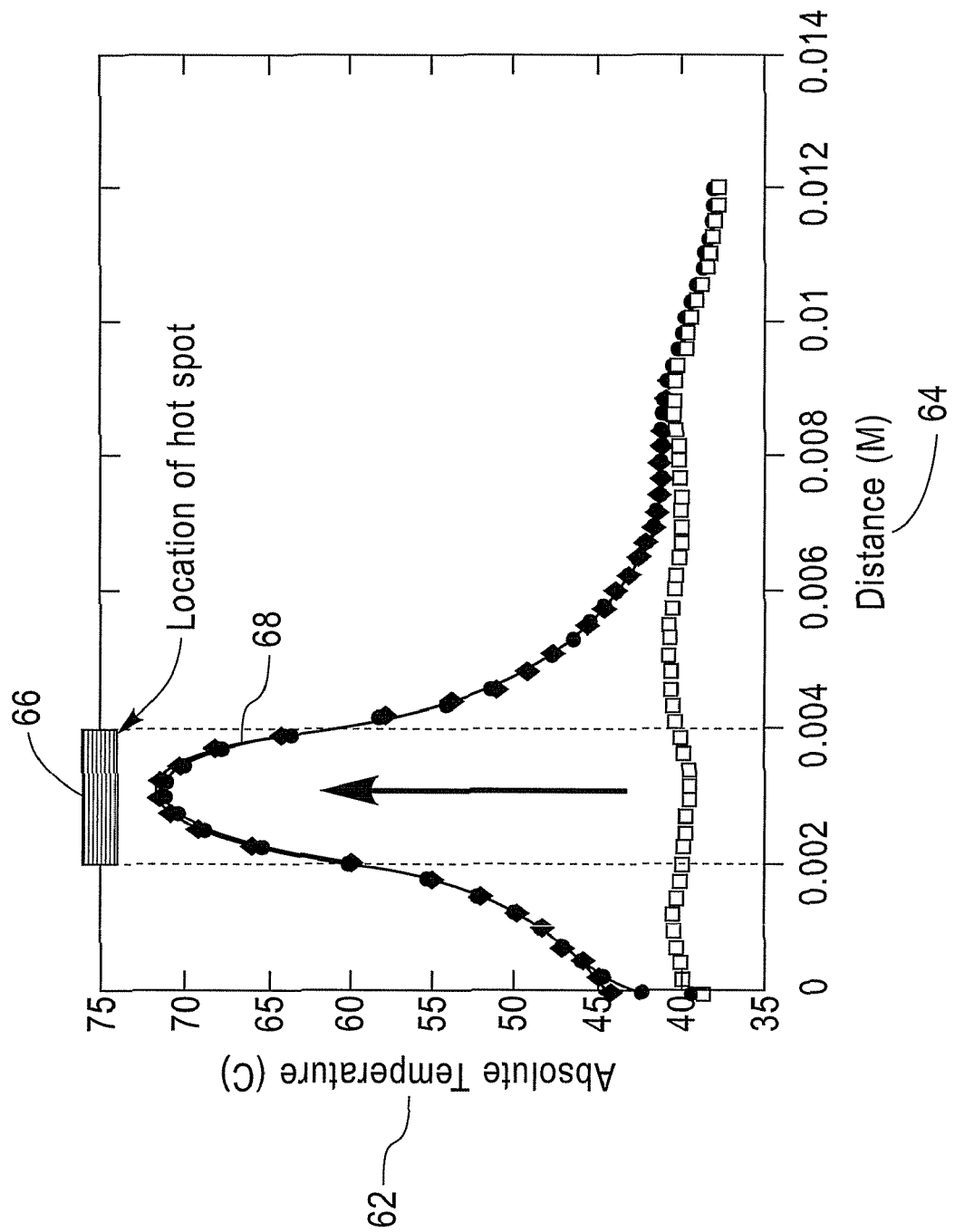
FIG. 2 is a graph of a steady state chip temperature hot spot power-on versus steady uniform power, in accordance with an embodiment of the invention.

FIG. 2 is a graph of a steady state chip temperature hot spot power-on versus steady uniform power, in accordance with an embodiment of the invention. In graph 60, the x-axis depicts the distance 64 measured from the left hand side edge of the microprocessor chip along x direction and the y-axis depicts the temperature 62. The location of the hot spot 66 is located at the peak of the curve 68. FIG. 2 shows the effect of hot spots at steady state, at which the temperature near the hot spot region increases to a peak value of 72° C. Thus the temperature of the hot spot is expected to fluctuate between 40-72° C. depending on the computational activity within the microprocessor.

Figure 3:
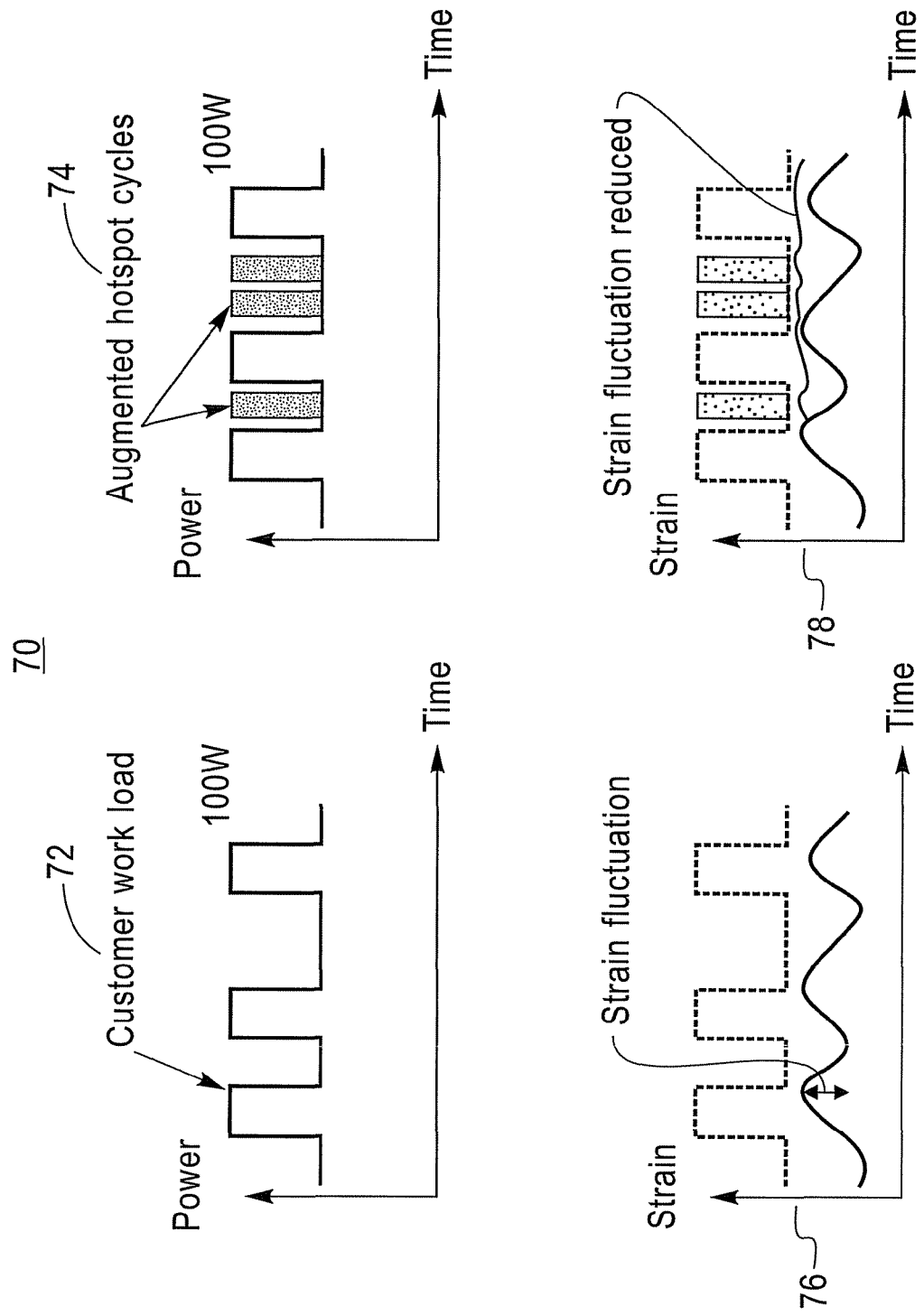
FIG. 3 are a series of graphs illustrating augmented hot spot cycles for C4 strain reduction, in accordance with an embodiment of the invention.

FIG. 3 depicts a series of graphs illustrating augmented hot spot cycles for C4 strain reduction, in accordance with an embodiment of the invention. The graphs 70 include a customer workload graph 72, an augmented hot spot cycle graph 74, a strain fluctuation graph 76, and a strain fluctuation reduced graph 78. Graphs 72 and 76 schematically show the strain, fluctuation due to random power dissipation. Graphs 74 and 78 show how additional power can be released in the hot spots using the same electronic devices by augmenting the customer workload with self-generated workload. Self-generated workload refers to computational activity that may be of value to the computer system itself and the customer will have no direct benefit from it.

The self-generated workload could include gainful housekeeping activity of a computer system, such as reliability monitoring functions, or it could be simply an artificial workload of no explicit computational value. One function of a self-generated workload is to smooth out the temperature fluctuation through additional operations for the purpose of reducing the μ-C4 strain. Even though the average power dissipated in the processor is expected to increase and the corresponding temperature of the hot spot region is likely to be higher, hie μ-C4 reliability is enhanced by this solution.

Figure 4:
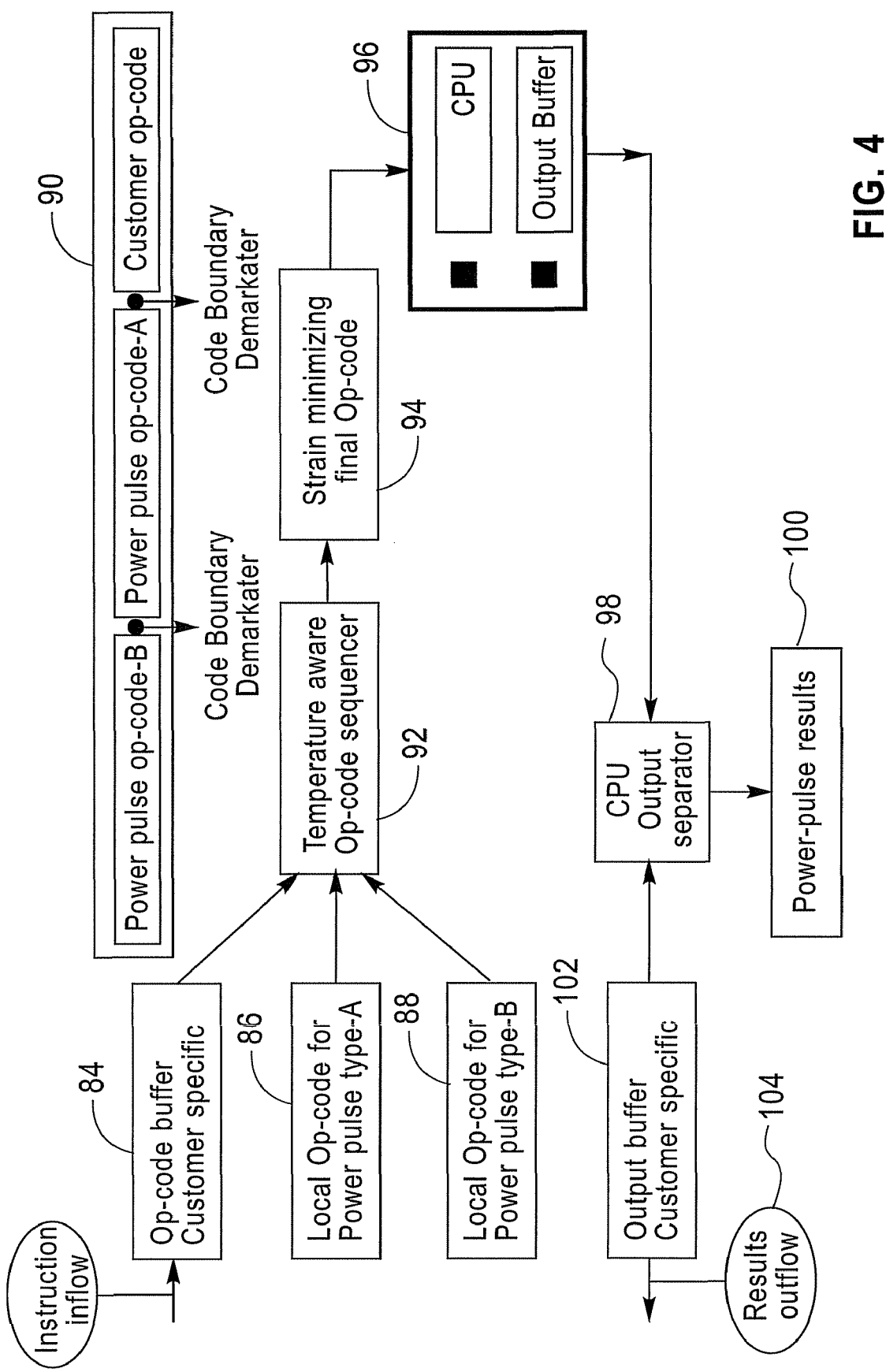
FIG. 4 is a block diagram of an open loop microprocessor implementation, in accordance with an embodiment of the invention.

FIG. 4 is a block diagram of an open loop microprocessor implementation for implementing a self-generated workload, in accordance with an embodiment of the invention. In order to produce a variety of power pulses (e.g. type-A or type-B) local op-codes must be designed and evaluated before implementing them in a product. A wider power pulse will require a longer series of computations where as a shorter pulse will require correspondingly smaller series of computations. The block diagram 80 includes customer specific instruction inflow port 82 that is inputted to an op-code buffer 84. Outputs of the customer specific op-code buffer 84, a local op-code for power pulse type-A 86, and a local, op-code for power pulse type-B 88 are delivered to a temperature aware op-code sequencer 92. The output of the temperature aware op-code sequencer 92 is provided to a strain minimizing final op-code 94, the output of which is provided to a central processing unit (CPU)/Buffer combination 96. The CPU/Buffer combination 96 completes the required processing of the op-codes presented to it by 94 and outputs the results to a CPU output separator 98, which separates the power pulse centric results into buffer 100 and customer specific results into buffer 102. The customer specific output butler 102 then provides the processed results to the customer at port 104. The block diagram 80 also includes an example (shown in block 90) of the op-code sequence composed of power pulse op-code-B, a power pulse op-code-A, and a customer op-code. It is understood that the op-codes must be separated by a demarkater so that the CPU will be able to perform the processing corresponding to each op-code set independent of each other.

FIG. 4 illustrates how the customer instruction set, called op-code, and the power-generating op-code can be sequenced. An estimate of the CPU hotspot temperature is required for the temperature aware op-code sequencer to make the sequencing decision. The temperature estimation can be determined by means of an open loop estimation process. Open loop refers to a configuration where there is no explicit or direct measurement of temperature or strain is made by means of a sensor system. According to the expected temperature from past workload, a sequencer augments the customer op-codes with appropriate local-op-codes (e.g., type-A, type-B etc.), in this implementation the temperature awareness and op-code sequencing are done in two distinct in order to reduce the fluctuation in strain. For example the temperature estimator may project a reduction in temperature of the hot spot if only the next pending customer op-code is executed. This first step thus facilitates the op-code sequencer to choose a power pulse producing op-code (of Type-A or Type-B) so that the anticipated drop in temperature can be prevented by the execution of the local op-code, thereby minimizing the temperature fluctuation on the electronic package consisting the microprocessor system.

Figure 5:
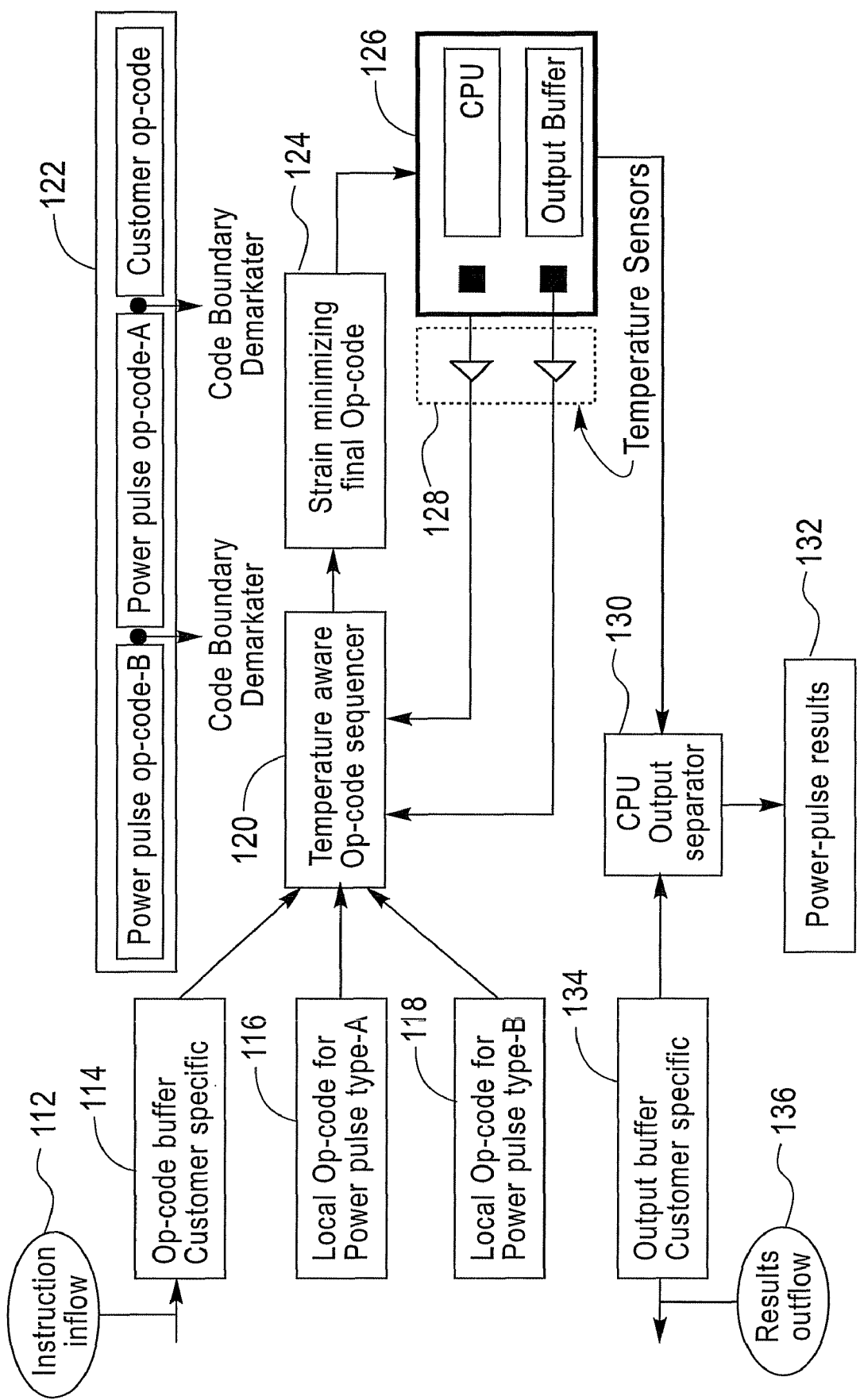
FIG. 5 is a block diagram of a feedback loop microprocessor implementation, in accordance with an alternative embodiment of the invention.

FIG. 5 is a block diagram of a feedback loop microprocessor implementation, in accordance with an alternative embodiment of the invention. The block diagram 110 includes an instruction inflow port 112 that is inputted in the customer specific op-code buffer 114. The customer specific op-code buffer 114, the local op-code for power pulse type-A 116, and the local op-code for power pulse type-B 118 are made available to the temperature aware op-code sequencer 120. The sequencer 120 in this embodiment has full knowledge of the hot-spot temperature as presented to it by sensors 128, and hence is driven by a feedback process. The output of the temperature aware op-code sequencer 120 is provided to the strain minimizing final op-code buffer 124 which output is provided to the central processing unit (CPU)/Buffer combination 126 for execution. The CPU/Buffer combination 126 outputs the results to output separator 130. The temperature sensors 128 embedded in the microprocessor unit measures the instantaneous temperature of the hot spot resulting from the execution of the op-codes presented to the CPU. The CPU output separator 130 separates the customer centric results and local op-code based results. Local op-code results are presented to buffer 132 and customer centric results are presented to customer specific buffer 134. The customer specific output buffer 134 then provides all the results to output port 136. The block diagram 110 also includes an example (shown in block 122) of the op-code sequence composed of power pulse op-code-B, a power pulse op-code-A, and a customer op-code, ft is understood that the op-codes must be separated by a demarkater so that the CPU will be able to perform the processing corresponding to each op-code set independent of each other.

FIG. 5 illustrates a feedback system in which temperature sensors 128 that are embedded in a processor chip directly provide a measurement of temperature fluctuation. Hence, the sequencer can achieve a more robust system-level control of the μ-C4 strain. This solution, however, imposes a complex feedback configuration where the customer workload may have to take lower priority occasionally in order to ensure that the μ-C4 strains are minimized. Since foe implementation is in digital form, the feedback configuration can always be temporarily disabled to provide higher priority to customer computation, as it is more critical than the broader objective of minimizing solder strain.

The exemplary embodiments of the present invention illustrated an open loop and a feedback loop form of implementation at a given processor level. However, in a complex system with multiple processors whose workload is scheduled by a supervisory controller, the customer workload can be sequenced to reduce the μ-C4 strain cycles without having to augment the sequence with artificial workloads. The primary solution, as illustrated in the exemplary embodiments, to smooth the temperature fluctuation by augmenting the customer workload with power generating pulses impacts total power dissipated in a package assembly. The silicon carrier thickness has been demonstrated to improve heat spreading near hot spots. By increasing the SiC (silicon carbide) thickness (substrate thickness) the temperature that drives the μ-C4 fatigue can be reduced.

In additions the copper lines that feed power and signals to a hot spot region in a Back-End-Of-The-Line (BEOL) can be intentionally increased in volumes thereby increasing the local heat capacity through thermal inertia. The BEOL is that portion of an integrated circuit fabrication, where the active components (e.g., transistors, resistors, etc.) am interconnected with wiring on the wafer. BEOL generally begins when the first layer of metal is deposited on the wafer. It includes contacts, insulator, metal levels, and bonding sites for chip-to-package connections. Dicing the wafer into individual integrated circuit chips is also a BEOL process. Increased thermal inertia reduces the temperature fluctuation in a material the same manner as a low pass filter in an electrical circuit that reduces signal fluctuation.

The capabilities of the present invention can be implemented in software, firmware, hardware or some combination thereof.

As one example, one or more aspects of the present invention can be included, in an article of manufacture (e.g., one or more computer program products) having, for instance, computer usable media. The media has embodied, therein, for instances computer readable program code means for providing and facilitating the capabilities of the present invention. The article of manufacture can be included as a part of a computer system or sold separately.

While the preferred, embodiment to the invention has been described, it will be understood that those skilled in the art, both now and in the future, may make various improvements and enhancements which fall, with the scope of the claims which follow. These claims should be construed to maintain the proper protection for the invention first described.

What is claimed is:

1. A system for reducing an impact of hot spot pulsing of a semiconductor device, the system comprising:
 first generating means for generating a plurality of local op-codes;
 a sequencer for augmenting customer op-codes with the plurality of local op-codes;
 selecting means for selecting one or more of the randomly arriving customer op-codes awaiting execution;
 monitoring means for tracking which of the one or more randomly arriving customer op-codes have been selected;
 separating means for separating the plurality of local op-codes from the one or more customer op-codes;
 storing means for storing one or more data related to the processing of the plurality of local op-codes and the customer op-codes; and
 second generating means for generating an output for a customer corresponding to that customer op-code while gainfully employing an output generated by local op-codes for system health monitoring purposes.

2. The system of claim 1, wherein the local op-codes are workloads generated by streaming power generating op-code sequences intended to reduce strain fluctuation.

3. The system of claim 2, wherein the workloads are self-induced by a computer system based on power producing potential of the customer op-codes.

4. The system of claim 3, wherein the self-induced workloads are gainfully executed to identify and prevent a failure mode of the computer system integral to a broader health monitoring function.

5. The system of claim 1, wherein the sequencer operates in an weak open-loop implementation in which the hot-spot temperature or strain of the computer processor is indirectly estimated and op-code sequencer is authorized to make the ultimate op-code sequencing decision not solely based on estimated temperature.

6. The system of claim 1, wherein the sequencer operates in a feedback implementation in which the hot-spot temperature is directly measured by means of embedded thermal or strain sensors and op-code sequencer merely facilitates the op-code sequencing operation solely based on the measured temperature or strain history.

7. A method for reducing an impact of hot spot pulsing of a semiconductor device, the method comprising:
   generating a plurality of local op-codes;
   augmenting customer op-codes with the plurality of local op-codes via a sequencer;
   selecting one or more of the customer op-codes awaiting execution;
   tracking which of the one or more customer op-codes have been selected for execution;
   separating the plurality of local op-codes from the one or more customer op-codes;
   storing one or more data resulting from the processing of the plurality of local op-codes; and
   generating an output for a customer corresponding to that customer op-code while gainfully employing an output generated by local op-codes for system health monitoring purposes.

8. The method of claim 7, wherein the local op-codes are workloads generated by streaming power generating op-code sequences intended to reduce strain fluctuation.

9. The method of claim 8, wherein the workloads are workloads that are self-induced by the system based on power producing potential of the customer op-codes.

10. The method of claim 9, wherein the workloads are executed for gainful identification and prevention of system failure mode of the computer system integral to a broader health monitoring function.

11. The method of claim 7, wherein the sequencer operates in an open-loop implementation in which the hot-spot temperature or strain of the computer processor is indirectly estimated and op-code sequencer is authorized to make the ultimate op-code sequencing decision not solely based on estimated temperature.

12. The method of claim 7, wherein the sequencer operates in a feedback implementation in which the hot-spot temperature is directly measured by means of embedded thermal or strain sensors and op-code sequencer merely facilitates the op-code sequencing operation solely based on the measured temperature or strain history.

* * * * *